United States Patent [19]

Nakada et al.

[11] Patent Number: 5,817,726

[45] Date of Patent: Oct. 6, 1998

[54] WATER-ABSORPTIVE SOFT OCULAR LENS MATERIAL, WATER-ABSORPTIVE SOFT OCULAR LENS SHAPED PRODUCT MADE THEREOF, WATER-ABSORPTIVE SOFT OCULAR LENS MADE THEREOF AND PROCESS FOR ITS PRODUCTION

[75] Inventors: Kazuhiko Nakada; Noriko Yoshimatsu, both of Kasugai; Shoji Ichinohe; Toshio Yamazaki, both of Gunma-ken, all of Japan

[73] Assignee: Menicon Co., Ltd., Nagoya, Japan

[21] Appl. No.: 709,845

[22] Filed: Sep. 10, 1996

[30] Foreign Application Priority Data

Sep. 11, 1995 [JP] Japan .................................. 7-232851

[51] Int. Cl.⁶ .................................................. C08F 230/08
[52] U.S. Cl. ........................................... 526/279; 523/107
[58] Field of Search ............................... 526/279; 523/107

[56] References Cited

U.S. PATENT DOCUMENTS 4,582,884 4/1986 Ratkowski ............................... 526/279

FOREIGN PATENT DOCUMENTS

| 0 241 796 | 10/1987 | European Pat. Off. . |
| 0 295 947 | 12/1988 | European Pat. Off. . |
| 0 653 446 | 5/1995 | European Pat. Off. . |
| 2 127 422 | 4/1984 | United Kingdom . |
| 86/01219 | 2/1986 | WIPO . |
| WO 86/01219 | 2/1986 | WIPO . |

Primary Examiner—Joseph L. Schofer
Assistant Examiner—Wu C. Cheng
Attorney, Agent, or Firm—Oblon, Spivak, McClelland, Maier & Neustadt, P.C.

[57] ABSTRACT

A substantially non-crosslinked water-absorptive soft ocular lens material obtained by polymerizing polymerizable components comprising a methoxysilane compound (A) of the formula (I):

$$X\text{—}Z\text{—}Si(OCH_3)_n(R^1)_{3-n} \qquad (I)$$

wherein X is a (meth)acryloyloxy group, a vinyl group, a group of the formula

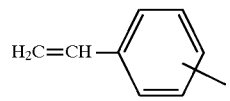

or an allyl group, Z is a direct bond or a $C_{1-3}$ alkylene group, $R^1$ is a $C_{1-6}$ alkyl group, and n is an integer of from 1 to 3, and a hydrophilic monomer (B) which has an unsaturated double bond copolymerizable with the methoxysilane compound (A) and which undergoes no crosslinking reaction, in an amount of at least 45 mol %.

4 Claims, No Drawings

WATER-ABSORPTIVE SOFT OCULAR LENS MATERIAL, WATER-ABSORPTIVE SOFT OCULAR LENS SHAPED PRODUCT MADE THEREOF, WATER-ABSORPTIVE SOFT OCULAR LENS MADE THEREOF AND PROCESS FOR ITS PRODUCTION

The present invention relates to a water-absorptive soft ocular lens material, a water-absorptive soft ocular lens shaped product made thereof, a water-absorptive soft ocular lens made of such a shaped product and a process for producing such a lens. More particularly, it relates to an ocular lens material to which a shaping method capable of producing a large quantity of ocular lenses such as contact lenses or intraocular lenses all at once at a low cost is applicable, an ocular lens shaped product made of such an ocular lens material, a water-absorptive soft ocular lens which is made of such an ocular lens shaped product and which is excellent not only in the transparency but also in the dimensional stability and durability, and a process for producing such an ocular lens with high precision at high productivity.

The properties required for ocular lenses, particularly for soft ocular lenses, include dimensional stability and durability, which have been regarded as particularly important in recent years. In order to obtain soft ocular lenses excellent in such dimensional stability and durability, it has heretofore been attempted to employ e.g. a polymer having a crosslinked structure.

To prepare ocular lenses made of a polymer having such a crosslinked structure, it is common to employ a lathe cutting and grinding method wherein the obtained polymer is processed into a desired shape by cutting and grinding, or a cast molding method wherein polymerization is carried out in a mold having a desired lens shape to obtain a lens.

However, when the above-mentioned lathe cutting and grinding method is employed, during preparation of lens blanks made of a polymer having a crosslinked structure, polymerization shrinkage takes place due to crosslinking, which leads to a problem that the operation efficiency tends to be low. Further, major portions of lens blanks except for the portions which eventually become lenses, will be cut off or ground off by the cutting or grinding processing. This is extremely uneconomical particularly when an expensive monomer is employed. Further, it is extremely cumbersome to apply cutting and grinding processing to many blanks individually, and a mass production, as in the case of the cast molding method, is impossible by the cutting and grinding method. Therefore, there is an additional problem that the productivity is poor.

On the other hand, when the cast molding method is employed, there is a problem that polymerization shrinkage takes place during the polymerization of the polymerizable components in the mold, whereby it is very difficult to mold ocular lenses of a desired specification precisely.

As a means to solve the problem of such cast molding method i.e. as a means to obtain ocular lenses by suppressing polymerization shrinkage during polymerization of the polymerizable components, a method has, for example, been proposed wherein in a case of polymerizing a monomer for imparting water absorptivity, an inert solvent is added to the monomer followed by casting and polymerization, and then the solvent is replaced by water to obtain a desired ocular lens (Japanese Unexamined Patent Publication No. 110311/1992).

However, when such a solvent is used for casting and polymerization, there will be a problem such that the solvent will remain without being replaced by water, so that the safety of the resulting ocular lens to eye tissues will deteriorate, a problem such that it takes substantial time for the operation of replacing the solvent by water, or a problem such that the resulting ocular lens tends to be inferior in the mechanical strength or dimensional stability.

As a method for shaping a material made of a plastic, it is common to employ a molding method wherein the material is melted or dissolved for shaping, such as an injection molding method or a compression molding method, whereby molding can be carried out at a low cost and in a large quantity.

However, such a molding method is practically inapplicable to shaping of a crosslinked material which can not be melted by heat or can not be dissolved in a solvent.

Such a molding method is applicable to shaping of a non-crosslinked material, but the molded product thereby obtained has no crosslinking structure and thus is inferior in the dimensional stability or durability.

Thus, the above-mentioned molding method which makes mass production possible at a low cost, can not be applied to a case where a soft ocular lens excellent in the dimensional stability or durability is to be obtained from a polymer having a crosslinked structure, as mentioned above.

The present invention has been made in view of the above-described prior art, and it is an object of the present invention to provide an ocular lens material to which a molding method which makes mass production feasible at a low cost, is applicable, as well as a process for producing an ocular lens from such a material at high productivity and with high precision and an ocular lens excellent in the dimensional stability and durability.

The present invention provides ① a substantially non-crosslinked water-absorptive soft ocular lens material obtained by polymerizing polymerizable components comprising a methoxysilane compound (A) of the formula (I):

wherein X is a (meth)acryloyloxy group, a vinyl group, a group of the formula

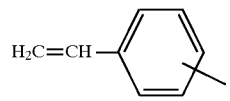

or an allyl group, Z is a direct bond or a $C_{1-3}$ alkylene group, $R^1$ is a $C_{1-6}$ alkyl group, and n is an integer of from 1 to 3, and a hydrophilic monomer (B) which has an unsaturated double bond copolymerizable with the methoxysilane compound (A) and which undergoes no crosslinking reaction, in an amount of at least 45 mol %; ② a water-absorptive soft ocular lens shaped product obtained by shaping the above water-absorptive soft ocular lens material into a shape of a desired ocular lens; ③ a water-absorptive soft ocular lens obtained by crosslinking the above water-absorptive soft ocular lens shaped product; and ④ A process for producing a water-absorptive soft ocular lens which comprises polymerizing polymerizable components comprising a methoxysilane compound (A) of the formula (I):

wherein X is a (meth)acryloyloxy group, a vinyl group, a group of the formula

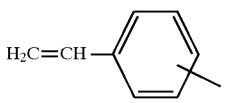

or an allyl group, Z is a direct bond or a $C_{1-3}$ alkylene group, $R^1$ is a $C_{1-6}$ alkyl group, and n is an integer of from 1 to 3, and a hydrophilic monomer (B) which has an unsaturated double bond copolymerizable with the methoxysilane compound (A) and which undergoes no crosslinking reaction, in an amount of at least 45 mol %, to obtain a substantially non-crosslinked water-absorptive soft ocular lens material, shaping the water-absorptive soft ocular lens material into a shape of a desired ocular lens, to obtain a water-absorptive soft ocular lens shaped product, and contacting the water-absorptive soft ocular lens shaped product with water to crosslink the water-absorptive soft ocular lens shaped product.

Now, the present invention will be described in detail with reference to the preferred embodiments.

The water-absorptive soft ocular lens material of the present invention is the one obtained by polymerizing polymerizable components comprising a methoxysilane compound (A) of the formula (I):

wherein X is a (meth) acryloyloxy group, a vinyl group, a group of the formula

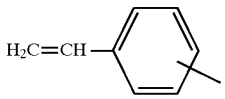

or an allyl group, Z is a direct bond or a $C_{1-3}$ alkylene group, $R^1$ is a $C_{1-6}$ alkyl group, and n is an integer of from 1 to 3, and a hydrophilic monomer (B) which has an unsaturated double bond copolymerizable with the methoxysilane compound (A) and which undergoes no crosslinking reaction, in an amount of at least 45 mole, and is substantially non-crosslinked, as mentioned above.

The methoxysilane compound (A) to be used in the present invention, is a compound of the formula (I) and is a component which polymerizes with other polymerizable components such as the hydrophilic monomer (B) and which induces a crosslinking reaction upon contact with water at the time of shaping a shaped product of the resulting ocular lens material into an ocular lens.

For example, as shown below, a crosslinking reaction occurs by a condensation (hydrolysis) reaction between methoxysilane groups derived from the methoxysilane compound (A) which is present in the ocular lens shaped product, whereby the resulting ocular lens will have a crosslinked structure.

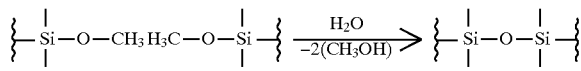

The above methoxysilane compound (A) is the one having a methoxy group bonded to the silicon atom. Therefore, when such a methoxysilane compound (A) is employed, the condensation reaction (crosslinking reaction) proceeds swiftly as compared with a silane compound having an alkoxyl group with at least two carbon atoms bonded to the silicon atom. Accordingly, for example, even if the water absorptivity of the resulting water-absorptive soft ocular lens material is high, the hydration swelling rate of a shaped product obtained from such an ocular lens material will never be larger than the crosslinking rate of the shaped product. Thus, the shaped product having a desired lens shape will be crosslinked substantially in that shape without deformation by swelling, whereby a water-absorptive soft ocular lens having a desired shape can be obtained with high precision.

In the formula (I) representing the methoxysilane compound (A), each of the (meth)acryloyloxy group, the vinyl group, the group of the formula

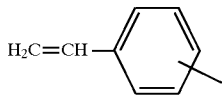

and the allyl group, represented by X, is a polymerizable group containing an unsaturated double bond. Z, $R^1$ and n may suitably be determined taking the reactivity for the condensation reaction into consideration.

In this specification, "(meth)acryl . . . " means "acryl . . . and/or methacryl . . .".

Typical examples of the above methoxysilane compound (A) include trimethoxysilylpropyl (meth)acrylate, vinyl trimethoxysilane, and trimethoxysilyl styrene. These compounds may be used alone or in combination as a mixture of two or more of them.

Among them, taking into consideration the copolymerizability with the hydrophilic monomer (B), p-trimethoxysilyl styrene is particularly preferred, when hydrophilic monomer (B) having a vinyl type polymerizable group such as a vinyl group, a group of the formula

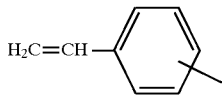

or an allyl group is used, and trimethoxysilylpropyl (meth) acrylate is particularly preferred, when a hydrophilic monomer (B) having a (meth)acrylate type polymerizable group, such as a (meth)acryloyl group, is employed.

The hydrophilic monomer (B) to be used in the present invention is a kind of a polymerizable compound which has an unsaturated double bond copolymerizable with the above methoxysilane compound (A) and which undergoes no crosslinking reaction, and it is a component useful to impart a hydrophilic nature and a desired water absorptivity to the finally obtainable ocular lens, i.e. a component to impart a hydrophilic nature to the water-absorptive soft ocular lens material and to suitably control the water content thereof.

Typical examples of such a hydrophilic monomer (B) include a hydroxyl group-containing monomer such as hydroxy styrene or a hydroxyalkyl (meth)acrylate such as 2-hydroxyethyl (meth)acrylate, hydroxybutyl (meth) acrylate or hydroxypropyl (meth)acrylate; an amino group-containing monomer such as amino styrene or an (alkyl) aminoalkyl (meth)acrylate such as 2-dimethylaminoethyl (meth)acrylate or 2-butylaminoethyl (meth)acrylate; an amide type monomer such as a dialkyl (meth)acrylamide such as N,N-dimethyl (meth)acrylamide, N,N-diethyl (meth)acrylamide or N,N-methylethyl (meth)acrylamide, or an alkyl (meth)acrylamide such as methyl (meth)acrylamide or ethyl (meth)acrylamide; an alkylene glycol mono(meth) acrylate such as propylene glycol mono(meth)acrylate; a pyrrolidone type monomer such as vinyl pyrrolidone; (meth) acrylic acid, maleic anhydride, fumaric acid, and a fumaric acid derivative. These monomers may be used alone or in combination as a mixture of two or more of them.

If such a hydrophilic monomer (B) is a monomer having a functional group such as a hydroxyl group, such a functional group is likely to preliminarily react with the methoxy group in the above methoxysilane compound (A) to form many crosslinking structures. To avoid such a possibility, it is particularly preferred to employ an amide type monomer or a pyrrolidone type monomer which does not have a functional group such as a hydroxyl group, a carboxyl group, an amino group or a glycol residue which is likely to react with the methoxysilane group in the above methoxysilane compound (A).

In the present invention, the substantially non-crosslinked material may be a material having a crosslinked structure partially formed to such an extent not to impair purpose of the present invention, for example, a material having a crosslinked structure partially formed, which is obtained by using the above-mentioned hydrophilic monomer (B) containing a hydroxyl group.

The polymerizable components to obtain the water-absorptive soft ocular lens material of the present invention comprise the above-mentioned methoxysilane compound (A) and the hydrophilic monomer (B). The total content of the methoxysilane compound (A) and the hydrophilic monomer (B) in the polymerizable components, is at least 45 mol %, preferably at least 50 mol %, so that the water content of the finally obtainable water-absorptive soft ocular lens will be within a desired range of e.g. from 30 to 60 wt %, and the crosslinking reaction of the methoxysilane compound (A) will readily takes place. Further, with a view to obtaining an ocular lens having a desired water content without bringing the crosslinking density of the ocular lens material to be too high, the total content of the methoxysilane compound (A) and the hydrophilic monomer (B) in the polymerizable components, is at most 97 mol %, preferably at most 95 mol %.

The content of the methoxysilane compound (A) in the polymerizable components, is preferably at least 3 mol %, more preferably at least 4 mol %, in order to increase the probability that methoxysilane groups derived from the methoxysilane compound (A) in the shaped product made of the resulting ocular lens material, are present close to one another and consequently to facilitate the crosslinking reaction so that the desired ocular lens can readily be produced. Further, in order to avoid the possibility that the number of methoxysilane groups in the ocular lens material is so large that the crosslinking density is too high, and the water content of the finally obtainable ocular lens decreases so that the ocular lens upon absorption of water tends to be brittle, or the elongation or the mechanical strength tends to be low, the content of the methoxysilane compound (A) in the polymerizable components, is preferably at most 15 mol %, more preferably at most 12 mol %.

The content of the hydrophilic monomer (B) in the polymerizable components, is usually at least 35 mol %, preferably at least 40 mol % and usually at most 80 mol %, preferably at most 75 mol %, in order to impart a desired water content, preferably a water content of from 30 to 60 wt %, to the finally obtainable ocular lens.

Further, when a monomer having a functional group which is likely to react with a methoxysilane group derived from the methoxysilane compound (A) to form a crosslinking structure during the polymerization for the production of the ocular lens material, such as the above-mentioned hydroxyl group-containing monomer, is used as the hydrophilic monomer (B), the amount of such a monomer is preferably at such a level that methoxysilane groups can adequately crosslink one another even if said functional group is reacted with the methoxysilane group, for example, at a level of not higher than 10 mol per 100 mol of the methoxysilane compound (A).

Further, in the present invention, in addition to the above-mentioned hydrophilic monomer (B), other monomers may be employed depending upon the desired physical property such as the water content of the water-absorptive soft ocular lens material, as polymerizable compounds which have an unsaturated double bond copolymerizable with the above methoxysilane compound (A) and which undergo no crosslinking reaction.

As such other monomers, monomers containing one copolymerizable unsaturated double bond i.e. monomers other than crosslinkable monomers or crosslinkable macromonomers having at least two polymerizable groups, may be mentioned. Otherwise, monomers which do not have a functional group which is likely to react with a methoxysilane group to form a crosslinking structure at the time of the polymerization, such as a hydroxyl group, in their molecules, may preferably be employed as such other monomers. However, in a case where a monomer having such a functional group, is employed, the amount may be adjusted to such a level that an adequate crosslinking reaction can be carried out among methoxysilane groups, as in the case of the above-mentioned hydrophilic monomer (B).

The above-mentioned other monomers may, for example, be monomers useful for adjusting the hardness of the resulting water-absorptive soft ocular lens material or for imparting e.g oxygen permeability or deposit resistance to the ocular lens material.

For example, in order to control the hardness of the water-absorptive soft ocular lens material to impart a desired softness thereto, one or more members may be selected for use from the group of hardness-controlling monomers including linear, branched or cyclic alkyl (meth)acrylates, alkoxyalkyl (meth)acrylates or alkylthioalkyl (meth) acrylates, such as methyl (meth)acrylate, ethyl (meth) acrylate, isopropyl (meth)acrylate, n-propyl (meth)acrylate, isobutyl (meth)acrylate, n-butyl (meth)acrylate, 2-ethylhexyl (meth)acrylate, n-octyl (meth)acrylate, n-decyl (meth)acrylate, n-dodecyl (meth)acrylate, t-butyl (meth) acrylate, pentyl (meth)acrylate, t-pentyl (meth)acrylate, hexyl (meth)acrylate, heptyl (meth)acrylate, nonyl (meth) acrylate, stearyl (meth)acrylate, cyclopentyl (meth)acrylate, cyclohexyl (meth)acrylate, 2-ethoxyethyl (meth)acrylate, 3-ethoxypropyl (meth)acrylate, 2-methoxyethyl (meth) acrylate, 3-methoxypropyl (meth)acrylate, ethylthioethyl (meth)acrylate, and methylthioethyl (meth)acrylate; styrene; α-methylstyrene; alkyl styrenes such as methyl styrene, ethyl styrene, propyl styrene, butyl styrene, t-butyl styrene, isobutyl styrene, and pentyl styrene; an alkyl-α-methyl styrenes such as methyl-α-methyl styrene, ethyl-α-methyl styrene, propyl-α-methyl styrene, butyl-α-methyl styrene, t-butyl-α-methyl styrene, isobutyl-α-methyl styrene, and pentyl-α-methyl styrene. Among these, alkyl (meth) acrylates and alkyl styrenes are particularly preferred, since they are excellent, for example, in copolymerizability with the methoxysilane compound (A). Further, a monomer, of which the glass transition point (hereinafter referred to as Tg) of the homopolymer, would be at most 40° C., is preferably employed.

Further, to impart oxygen permeability to the water-absorptive soft ocular lens material, it is possible to employ a silicon-containing monomer other than the methoxysilane compound (A), such as an organopolysiloxane-containing alkyl (meth)acrylate such as pentamethyldisiloxanylmethyl (meth)acrylate, trimethylsiloxydimethylsilylpropyl (meth) acrylate, methylbis(trimethylsiloxy)silylpropyl (meth) acrylate, tris(trimethylsiloxy)silylpropyl (meth)acrylate, mono[methylbis(trimethylsiloxy)siloxy]bis(trimethyl siloxy)silylpropyl (meth)acrylate, tris[methylbis (trimethylsiloxy)siloxy]silylpropyl (meth)acrylate, methyl [bis(trimethylsiloxy)]silylpropylglyceryl (meth)acrylate, tris (trimethylsiloxy)silylpropylglyceryl (meth)acrylate, mono [methylbis(trimethylsiloxy)siloxy]bis(trimethyl siloxy) silylpropylglyceryl (meth)acrylate, trimethylsilylethyltetramethyldisiloxanylpropylglyceryl (meth)acrylate, trimethylsilylmethyl (meth)acrylate, trimethylsilylpropyl (meth)acrylate, trimethylsilylpropylglyceryl (meth)acrylate, pentamethyldisiloxanylpropylglyceryl (meth)acrylate, methylbis(trimethylsiloxy) silylethyltetramethyl disiloxanylmethyl (meth)acrylate, tetramethyltriisopropylcyclotetrasiloxanylpropyl (meth) acrylate, tetramethyltriisopropylcyclotetrasiloxybis (trimethyl siloxy)silylpropyl (meth)acrylate, or trimethylsiloxydimethylsilylpropyl (meth)acrylate; an alkyl vinyl silane such as trimethyl vinyl silane; or an organopolysiloxane-containing styrene derivative of the formula (II):

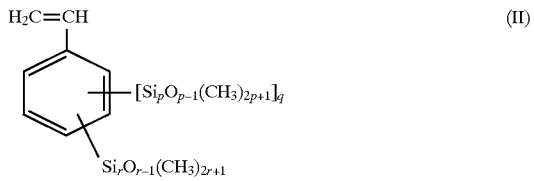

where p is an integer of from 1 to 15, q is 0 or 1, and r is an integer of from 1 to 15.

With respect to the organopolysiloxane-containing styrene derivative of the above formula (II), if p or r is an integer of 16 or higher, its synthesis or purification tends to be difficult, and the hardness of the resulting ocular lens material tends to be very low, and if q is an integer of 2 or higher, the synthesis of such an organopolysiloxane-containing styrene derivative tends to be difficult.

Typical examples of the styrene derivative of the above formula (II) include tris(trimethylsiloxy)silyl styrene, bis (trimethylsiloxy)methylsilyl styrene, dimethylsilyl styrene, trimethylsilyl styrene, tris(trimethylsiloxy) siloxanyldimethylsilyl styrene, [bis(trimethylsiloxy) methylsiloxanyl]dimethylsilyl styrene, pentamethyldisiloxanyl styrene, heptamethyltrisiloxanylstyrene, nonamethyltetrasiloxanyl styrene, pentadecamethylheptasiloxanyl styrene, heneicosamethyldecasiloxanyl styrene, heptacosamethyltridecasiloxanyl styrene, hentriacontamethylpentadecasiloxanyl styrene, trimethylsiloxypentamethyldisiloxymethylsilyl styrene, tris(pentamethyldisiloxy)silyl styrene, (tristrimethylsiloxy)siloxanylbis(trimethylsiloxy) silyl styrene, bis(heptamethyltrisiloxy)methylsilyl styrene, tris(methylbistrimethylsiloxysiloxy)silyl styrene, trimethylsiloxybis(tristrimethylsiloxysiloxy)silyl styrene, heptakis(trimethylsiloxy)trisiloxanyl styrene, tris (tristrimethylsiloxysiloxy)silyl styrene, (tristrimethylsiloxyhexamethyl)tetrasiloxy(tristrimethyl siloxy)siloxytrimethylsiloxysilyl styrene, nonakis (trimethylsiloxy)tetrasiloxanyl styrene, bis (tridecamethylhexasiloxy)methylsilyl styrene, heptamethylcyclotetrasiloxanyl styrene, heptamethylcyclotetrasiloxybis (trimethylsiloxy)silyl styrene and tripropyltetramethylcyclotetrasiloxanyl styrene.

These silicon-containing monomers may be used alone or in combination as a mixture of two or more of them. Among them tris(trimethylsiloxy)silylpropyl (meth)acrylate among the organopolysiloxane-containing alkyl (meth)acrylates, or tris(trimethylsiloxy)silyl styrene among the organopolysiloxane-containing styrene derivatives, is particularly preferred from the viewpoint that it is excellent in the copolymerizability with e.g. the methoxysilane compound (A).

Further, to impart deposit resistance to the water-absorptive soft ocular lens material, a fluorine-containing monomer of the formula (III):

$$H_2C=CR^2COOC_sH_{(2s-t-u+1)}F_t(OH)_u \qquad (III)$$

wherein $R^2$ is a hydrogen atom or a methyl group, s is an integer of from 1 to 15, t is an integer of from 1 to (2s+1), and u is an integer of from 0 to 2, may be used.

Typical examples of the fluorine-containing monomer of the formula (III) include 2,2,2-triflouroethyl (meth)acrylate, 2,2,3,3-tetrafuloropropyl (meth)acrylate, 2,2,3,3-tetrafluoro-t-pentyl (meth)acrylate, 2,2,3,4,4,4-hexafluorobutyl (meth)acrylate, 2,2,3,4,4,4-hexafluoro-t-hexyl (meth)acrylate, 2,3,4,5,5,5-hexafluoro-2,4-bis (trifluoromethyl)pentyl (meth)acrylate, 2,2,3,3,4,4-hexafluorobutyl (meth)acrylate, 2,2,2,2',2',2'-hexafluoroisopropyl (meth)acrylate, 2,2,3,3,4,4-heptaflourobutyl (meth)acrylate, 2,2,3,3,4,4,5,5-octafluoropentyl (meth)acrylate, 2,2,3,3,4,4,5,5,5-nonaflouropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate, 2,2,3,3,4,4,5,5,6,6,7,7-tridecafluoroheptyl (meth)acrylate, 3,3,4,4,5,5,6,6,7,7,8,8,9,9,10,10-hexadecafluorodecyl (meth)acrylate, 3,3,4,4,5,5,6,6,7,7,8,8,9,9,10,10,10-heptadecafluorodecyl (meth)acrylate, 3,3,4,4,5,5,6,6,7,7,8,8,9,9,10,10,11,11-octadecafluoroundecyl (meth)acrylate, 3,3,4,4,5,5,6,6,7,7,8,8,9,9,10,10,11,11,11-nonadecafluoroundecyl (meth) acrylate, 3,3,4,4,5,5,6,6,7,7,8,8,9,9,10,10,11,11,12,12-encosafluorododecyl (meth)acrylate, 2-hydroxy-4,4,5,5,6,7,7,7-octafluoro-6-trifluoropentylheptyl (meth)acrylate, 2-hydroxy-4,4,5,5,6,6,7,7,8,9,9,9-dodecafluoro-8-trifluoromethylnonyl (meth)acrylate, and 2-hydroxy-4,4,5,5,6,6,7,7,8,8,9,9,10,11,11,11-hexadecafluoro-10-trifuloromethylundecyl (meth)acrylate. These monomers may be used alone or in combination as a mixture of two or more of them.

Among these, 2,2,2-trifluoroethyl (meth)acrylate and 2,2,2,2',2',2'-hexafluoroisopropyl (meth)acrylate are particularly preferred, since they are excellent in copolymerizability with e.g. the methoxysilane compound (A).

The content of the above described other monomers in the polymerizable components may be suitably adjusted so that the total amount of the polymerizable components becomes 100 mol %. However, to obtain adequate effects by the use of such other monomers, their content is preferably at least 3 mol %, particularly preferably at least 5 mol %. On the other hand, in order to avoid such a possibility that the contents of the methoxysilane compound (A) and the hydrophilic monomer (B) become relatively so small that the water content of the ocular lens material decreases, or the amount of the methoxysilane groups in the shaped product obtained from such an ocular lens material becomes so small that no adequate crosslinking can be carried out, the content of such other monomers is preferably at most 55 mol %, particularly preferably at most 50 mol %.

Further, in order to impart ultraviolet absorptivity or a color to the resulting water-absorptive soft ocular lens material, a polymerizable ultraviolet absorber, a polymerizable dyestuff or a polymerizable ultraviolet absorbing dyestuff, which has a color forming functional group or an ultraviolet absorbing functional group, may, for example, be used as other monomer.

Specific examples of the polymerizable ultraviolet absorber include benzophenone type polymerizable ultraviolet absorbers such as 2-hydroxy-4-(meth)acryloyloxybenzophenone, 2-hydroxy-4-(meth)acryloyloxy-5-tert-butylbenzophenone, 2-hydroxy-4-(meth)acryloyloxy-2',4'-dichlorobenzophenone and 2-hydroxy-4-(2'-hydroxy-3'-(meth)acryloyloxypropoxy)benzophenone; benzotriazole type polymerizable ultraviolet absorbers such as 2-(2'-hydroxy-5'-(meth)acryloyloxyethylphenyl)-2H-benzotriazole, 2-(2'-hydroxy-5'-(meth)acryloyloxyethylphenyl)-5-chloro-2H-benzotriazole, 2-(2'-hydroxy-5'-(meth)acryloyloxypropylphenyl)-2H-benzotriazole and 2-(2'-hydroxy-5'-(meth)acryloyloxypropyl-3'-tert-butylphenyl) -5-chloro-2H-benzotriazole; salicylic acid derivative-type polymerizable ultraviolet absorbers such as phenyl 2-hydorxy-4-(meth)acryloyloxymethylbenzoate; and other polymerizable ultraviolet absorbers such as methyl 2-cyano-3-phenyl-3-(3'-(meth)acryloyloxyphenyl)propenoate. These polymerizable ultraviolet absorbers may be used alone or in combination as a mixture of two or more of them.

Specific examples of the polymerizable dyestuff include azo type polymerizable dyestuffs such as 1-phenylazo-4-(meth)acryloyloxynaphthalene, 1-phenylazo-2-hydroxy-3-(meth)acryloyloxynaphthalene, 1-naphthylazo-2-hydroxy-3-(meth)acryloyloxynaphthalene, 1-(α-anthrylazo)-2-hydroxy-3-(meth)acryloyloxynaphthalene, 1-((4'-(phenylazo)phenyl)azo)-2-hydroxy-3-(meth)acryloyloxynaphthalene, 1-(2',4'-xylylazo)-2-(meth)acryloyloxynaphthalene, 1-(o-tolylazo)-2-(meth)acryloyloxynaphthalene, 2-(m-(meth)acryloylamide-anilino)-4,6-bis(1'-(o-tolylazo)-2'-naphthylamino)-1,3,5-triazine, 2-(m-vinylanilino)-4-((4'-nitrophenylazo)-anilino)-6-chloro-1,3,5-triazine, 2-(1'-(o-tolylazo)-2'-naphthyloxy-4-(m-vinylanilino)-6-chloro-1,3,5-triazine, 2-(p-vinylanilino)-4-(1'-(o-tolylazo)-2'-naphthylamino)-6-chloro-1,3,5-triazine, N-(1'-(o-tolylazo)-2'-naphthyl)-3-vinylphthalic acid monoamide, N-(1'-(o-tolylazo)-2'-naphthyl)-6-vinylphthalic acid monoamide, 3-vinylphthalic acid-(4'-(p-sulfophenylazo)-1'-naphthyl)monoester, 6-vinylphthalic acid-(4'-(p-sulfophenylazo)-1'-naphthyl)monoester, 3-(meth)acryloylamide-4-phenylazophenol, 3-(meth)acryloylamide-4-(8'-hydroxy-3',6'-disulfo-1'-naphthylazo) phenol, 3-(meth)acryloylamide-4-(1'-phenylazo-2'-naphthylazo)phenol, 3-(meth)acryloylamide-4-(p-tolylazo)phenol, 2-amino-4-(m-(2'-hydroxy-1'-naphthylazo)anilino)-6-isopropenyl-1,3,5-triazine, 2-amino-4-(N-methyl-p-(2'-hydroxy-1'-naphthylazo)anilino)-6-isopropenyl-1,3,5-triazine, 2-amino-4-(m-(4'-hydroxy-1'-phenylazo)anilino)-6-isopropenyl-1,3,5-triazine, 2-amino-4-(N-methyl-p-(4'-hydroxyphenylazo)anilino)-6-isopropenyl-1,3,5-triazine, 2-amino-4-(m-(3'-methyl-1'-phenyl-5'-hydroxy-4'-pyrazolylazo)anilino)-6-isopropenyl-1,3,5-triazine, 2-amino-4-(N-methyl-p-(3'-methyl-1'-phenyl-5'-hydroxy-4'-pyrazolylazo)anilino)-6-isopropenyl-1,3,5-triazine, 2-amino-4-(p-phenylazoanilino)-6-isopropenyl-1,3,5-triazine and 4-phenylazo-7-(meth)acryloylamide-1-naphthol; anthraquinone type polymerizable dyestuffs such as 1,5-bis((meth)acryloylamino)-9,10-anthraquinone, 1-(4'-vinylbenzoylamide)-9,10-anthraquinone, 4-amino-1-(4'-vinylbenzoylamide)-9,10-anthraquinone, 5-amino-1-(4'-vinylbenzoylamide)-9,10-anthraquinone, 8-amino-1-(4'-vinylbenzoylamide)-9,10-anthraquinone, 4-nitro-1-(4'-vinylbenzoylamide)-9,10-anthraquinone, 4-hydroxy-1-(4'-vinylbenzoylamide)-9,10-anthraquinone, 1-(3'-vinylbenzoylamide)-9,10-anthraquinone, 1-(2'-vinylbenzoylamide)-9,10-anthraquinone, 1-(4'-isopropenylbenzoylamide)-9,10-anthraquinone, 1-(3'-isopropenylbenzoylamide)-9,10-anthraquinone, 1-(2'-isopropenylbenzoylamide)-9,10-anthraquinone, 1,4-bis-(4'-vinylbenzoylamide)-9,10-anthraquinone, 1,4-bis-(4'-isopropenylbenzoylamide)-9,10-anthraquinone, 1,5-bis-(4'-vinylbenzoylamide)-9,10-anthraquinone, 1,5-bis-(4'-isopropenylbenzoylamide)-9,10-anthraquinone, 1-methylamino-4-(3'-vinylbenzoylamide)-9,10-anthraquinone, 1-methylamino-4-(4'-vinylbenzoyloxyethylamino)-9,10-anthraquinone, 1-amino-4-(3'-vinylphenylamino)-9,10-anthraquinone-2-sulfonic acid, 1-amino-4-(4'-vinylphenylamino)-9,10-anthraquinone-2-sulfonic acid, 1-amino-4-(2'-vinylbenzylamino)-9,10-anthraquinone-2-sulfonic acid, 1-amino-4-(3'-(meth)acryloylaminophenylamino)-9,10-anthraquinone-2-sulfonic acid, 1-amino-4-(3'-(meth)acryloylaminobenzylamino)-9,10-anthraquinone-2-sulfonic acid, 1-(β-ethoxycarbonylallylamino)-9,10-anthraquinone, 1-(β-carboxyallylamino)-9,10-anthraquinone, 1,5-di-(β-carboxyallylamino)-9,10-anthraquinone, 1-(β-isopropoxycarbonylallylamino)-5-benzoylamide-9,10-anthraquinone, 2-(3'-(meth)acryloylamide-anilino)-4-(3'-(3"-sulfo-4"-aminoanthraquinon-1"-yl)amino-anilino)-6-chloro-1,3,5-triazine, 2-(3'-(meth)acryloylamide-anilino)-4-(3'-(3"-sulfo-4"-aminoanthraquinon-1"-yl)amino-anilino)-6-hydrazino-1,3,5-triazine, 2,4-bis-((4"-methoxyanthraquinon-1"-yl)amino)-6-(3'-vinylanilino)-1,3, 5-triazine and 2-(2'-vinylphenoxy)-4-(4'-(3"-sulfo-4"-aminoanthraquinon-1"-yl-amino)anilino)-6-chloro-1,3,5-triazine; nitro type polymerizable dyestuffs such as o-nitroanilinomethyl (meth)acrylate; and phthalocyanine type polymerizable dyestuffs such as (meth)acryloyl-modified tetraamino copper phthalocyanine and (meth)acryloyl-modified (dodecanoyl-modified tetraamino copper phthalocyanine). These polymerizable dyestuffs may be used alone or in combination as a mixture of two or more of them.

Specific examples of the polymerizable ultraviolet absorbing dyestuff include benzophenone type polymerizable ultraviolet absorbing dyestuffs such as 2,4-dihydroxy-3-(p-styrenoazo)benzophenone, 2,4-dihydroxy-5-(p-styrenoazo)benzophenone, 2,4-dihydroxy-3-(p-(meth)acryloyloxymethylphenylazo)benzophenone, 2,4-dihydroxy-5-(p-(meth)acryloyloxymethylphenylazo)-benzophenone, 2,4-dihydroxy-3-(p-(meth)acryloyloxyethylphenylazo)benzophenone, 2,4-dihydroxy-5-(p-(meth)acryloyloxyethylphenylazo)-benzophenone, 2,4-dihydroxy-3-(p-(meth)acryloyloxypropylphenylazo)benzophenone, 2,4-dihydroxy-5-(p-(meth)acryloyloxypropylphenylazo)-benzophenone, 2,4-dihydroxy-3-(o-(meth)acryloyloxymethylphenylazo)benzophenone, 2,4-dihydroxy-5-(o-(meth)acryloyloxymethylphenylazo)-benzophenone, 2,4-dihydroxy-3-(o-(meth)acryloyloxyethylphenylazo)benzophenone, 2,4-dihydroxy-5-(o-(meth)acryloyloxyethylphenylazo)-benzophenone, 2,4-dihydroxy-3-(o-(meth)acryloyloxypropylphenylazo)benzophenone, 2,4-dihydroxy-5-(o-(meth)acryloyloxypropylphenylazo)-benzophenone, 2,4-dihydroxy-3-(p-(N,N-di(meth)acryloyloxyethylamino)phenylazo)benzophenone, 2,4-dihydroxy-5-(p-(N,N-di(meth)acryloyloxyethylamino)phenylazo)benzophenone, 2,4-dihydroxy-3-(o-(N,N-di (meth)acryloyloxyethylamino)phenylazo)benzophenone, 2,4-dihydroxy-5-(o-(N,N-di(meth)acryloylethylamino) phenylazo)benzophenone, 2,4-dihydroxy-3-(p-(N-ethyl-N-(meth)acryloyloxyethylamino)phenylazo)benzophenone, 2,4-dihydroxy-5-(p-(N-ethyl-N-(meth) acryloyloxyethylamino)phenylazo)benzophenone, 2,4-dihydroxy-3-(o-(N-ethyl-N-(meth)acryloyloxyethylamino) phenylazo)benzophenone, 2,4-dihydroxy-5-(o-(N-ethyl-N-(meth)acryloyloxyethylamino)phenylazo)benzophenone, 2,4-dihydroxy-3-(p-(N-ethyl-N-(meth)acryloylamino) phenylazo)benzophenone, 2,4-dihydroxy-5-(p-(N-ethyl-N-(meth)acryloylamino)phenylazo)benzophenone, 2,4-dihydroxy-3-(o-(N-ethyl-N-(meth)acryloylamino) phenylazo)benzophenone and 2,4-dihydroxy-5-(o-(N-ethyl-N-(meth)acryloylamino)phenylazo)benzophenone; and benzoic acid type polymerizable ultraviolet absorbing dyestuffs such as phenyl 2-hydroxy-4-(p-styrenoazo)benzoate. These polymerizable ultraviolet absorbing dyestuffs may be used alone or in combination as a mixture of two or more of them.

The content of the above-mentioned polymerizable ultraviolet absorber, polymerizable dyestuff and polymerizable ultraviolet absorbing dyestuff is suitably adjusted so that the total amount of the polymerizable components becomes 100 mol %. Such a content is substantially influenced by the thickness of the lens, but it is usually at least 0.0001 mol %, preferably at least 0.001 mol %, so that the effects of using them are sufficiently obtained. On the other hand, in order not to deteriorate the physical properties of the lens, such as the mechanical strength, such a content is usually at most 0.1 mol %, preferably at most 0.05 mol %.

Further, in consideration of the toxicity of the ultraviolet absorber or dyestuff, due care is necessary to make the material suitable as a material for ocular lenses such as contact lenses which are in direct contact with living tissues or intraocular lenses embedded in living bodies. Further, particularly in the case of a dyestuff, due care is necessary not to let the color of the lens be so deep that the transparency decreases, and visible rays tend to be hardly transmitted through the lens.

The substantially non-crosslinked water-absorptive soft ocular lens material of the present invention can be obtained by polymerizing the polymerizable components comprising the methoxysilane compound (A) and the hydrophilic monomer (B), in an amount of at least 45 mol %, and, if necessary, other monomers.

In the present invention, the polymerization can be carried out by a conventional method by adjusting the amounts of the methoxysilane compound (A) and the hydrophilic monomer (B) as well as the amounts of the monomers and adding e.g. a radical polymerization initiator thereto.

The conventional method is, for example, a method wherein a radical polymerization initiator is added to the polymerizable components in a suitable mold or container, followed by gradual heating within a temperature range of from room temperature to 130° C. for from 2 to 72 hours, or by irradiation of an electromagnetic wave such as a microwave, ultraviolet rays or a radiation (such as γ-rays). In the case of heat polymerization, the temperature may stepwise be raised for quenching. The polymerization may be carried out by a bulk polymerization method or a solution polymerization method employing e.g. a solvent such as tetrahydrofuran or toluene, or by other methods.

Typical examples of the above-mentioned radical polymerization initiator include azobisisobutyronitrile, azobisodimethylvaleronitrile, benzoyl peroxide, t-butyl hydroperoxide and cumene hydroperoxide. These initiators may be used alone or in combination as a mixture of two or more of them.

In a case where the polymerization is carried out by means of e.g. light rays, it is preferred to further incorporate a photopolymerization initiator or a sensitizer. The amount of such a photopolymerization initiator or a sensitizer is usually from 0.001 to 2 parts by weight, preferably from 0.01 to 1 part by weight, per 100 parts by weight of the total amount of the polymerizable components.

The water-absorptive soft ocular lens material of the present invention may be in such a form that the ocular lens material can be subjected to shaping to obtain a water-absorptive soft ocular lens shaped product as described hereinafter. As such a form, a rod-, block-, plate-, sheet- or powder-form may, for example, be mentioned. To obtain an ocular lens material of e.g. a rod-, block, plate- or sheet-form, the polymerization of the polymerizable components may be carried out, for example, in a test tube or in a mold or container such as a cell mold. Further, to obtain an ocular lens material of e.g. a powder form, a solution polymerization may be carried out, and the polymer solution thereby obtained may be dropwise added to a poor solvent for the polymer, such as hexane or dioxane, whereupon the obtained polymer is dried.

The water content of the water-absorptive soft ocular lens material thus obtained, may be within such a range to satisfy the water content, dimensional stability, etc. of the finally obtainable water-absorptive soft ocular lens.

The ocular lens material preferably has a water content of at least 30 wt % upon absorption of water, so that water can be penetrated into the interior of a shaped product formed from such a material, a crosslinking reaction can be adequately carried out even in the interior of the shaped product and an ocular lens having an adequate water content and excellent dimensional stability can be obtained. Further, the water content of the ocular lens material is preferably at most 60 wt % to avoid the possibility that hydration swelling proceeds more quickly than the crosslinking reaction at the time of preparing an ocular lens by crosslinking the shaped product by contacting the shaped product with water and to obtain an ocular lens having a highly precise desired shape and excellent dimensional stability.

Further, the water-absorptive soft ocular lens material preferably has a number average molecular weight of at least 50,000 to make sure that an adequate quantity of methoxysilane groups are present in its molecule, and the crosslinking reaction of the shaped product formed from that material will proceed sufficiently. Further, to maintain the fluidity of the water-absorptive soft ocular lens material during molding, the number average molecular weight of the ocular lens material is preferably at most 3,000,000.

Then, a water-absorptive soft ocular lens shaped product of the present invention can be obtained by shaping the above ocular lens material into a shape of a desired ocular lens.

As a shaping method for shaping the above ocular lens material, an injection molding method or a compression molding method may, for example, be mentioned. In the present invention, two or more of such molding methods may be used in combination, and if required, mechanical processing such as cutting, grinding or polishing may also be applied.

The injection molding method is a method wherein the ocular lens material is put into an injection molding machine provided with a mold having a shape of a desired ocular lens, and the ocular lens material heated to a molten state at a temperature of from 80° to 350° C. is injected into the mold under a high pressure of from 300 to 1,500 kgf/cm$^2$, followed by maintaining the pressure, then the ocular lens material in the mold is solidified, and the mold is opened to obtain a shaped product.

The above compression molding method is a method wherein a compression molding machine provided with a mold having a shape of a desired ocular lens, is used in such a manner that a necessary amount of the ocular lens material of a powder- or plate-form, or tablets obtained by preliminarily shaping the powder-form ocular lens material, are put into the above mold and, after closing the mold, pressed under a pressure of from 300 to 1,500 kgf/cm$^2$ and heated at a temperature of from 80° to 350° C., over a period of from 5 to 60 minutes, to cure the ocular lens material, and then the mold is opened to obtain a shaped product.

To prepare an intraocular lens among water-absorptive soft ocular lenses, shaped products corresponding to the lens portion and the support portion of an intraocular lens may separately be formed, and they may be later bonded to each other. Otherwise, they may be integrally molded.

Then, the above ocular lens shaped product is contacted with water to have the shaped product crosslinked, to obtain a water-absorptive soft ocular lens of the present invention.

As a method of contacting the ocular lens shaped product with water, boiling treatment in water, autoclave (high temperature high pressure steam) treatment, acid treatment, a method of holding in water or a method of holding under high humidity may, for example, be mentioned.

The boiling treatment in water is a method which comprises immersing the ocular lens shaped product in a water bath, followed by boiling treatment for from 1 to 72 hours.

The acid treatment is a method which comprises immersing the ocular lens shaped product in an acid solution such as a hydrochloride acid solution with a concentration of e.g. from 0.01 to 1N, for acid treatment.

The method of holding in water is a method which comprises immersing the ocular lens shaped product in water at a temperature of e.g. from 20° to 60° C. for from 5 to 120 minutes.

The method of holding under high humidity is a method which comprises holding the ocular lens shaped product in a high humidity atmosphere with a relative humidity of e.g. from 80 to 100% for from 2 to 72 hours for treatment.

In the present invention, these methods may be used in a proper combination of two or more of them to contact the ocular lens shaped product with water.

By crosslinking the substantially non-crosslinked ocular lens shaped product in this manner, a water-absorptive soft ocular lens of the present invention can be obtained.

The water content of the obtained ocular lens upon absorption of water, is preferably at least 30 wt % particularly with a view to maintaining the function as a water-absorptive contact lens and is preferably at most 60 wt % with a view to controlling the crosslinking reaction and swelling of the ocular lens by hydration. In the present invention, the water content of the ocular lens may be adjusted by properly adjusting the types and amounts of the hydrophilic monomer (B) and other monomers, which are used to prepare the ocular lens material.

The water-absorptive soft ocular lens obtained by crosslinking the shaped product formed by shaping the substantially non-crosslinked ocular lens material of the present invention, is excellent not only in the transparency but also in dimensional stability and durability, and it can be prepared with high precision at a low cost and at high productivity by the process of the present invention.

Now, the present invention will be described in further detail with reference to Examples. However, it should be understood that the present invention is by no means restricted to such specific Examples.

EXAMPLE 1

The polymerizable components as identified in Table 1 were blended with azobisisobutyronitrile (hereinafter referred to as AIBN) as a polymerization initiator in an amount as identified in Table 1, per 100 parts by weight of the polymerizable components, and the mixture was sealed in a test tube.

Then, the test tube was immersed in a constant-temperature bath, and the polymerizable components were polymerized over a period of 48 hours while gradually raising the temperature from 35° C. to 50° C.

The test tube was further transferred to a drier, and the temperature was gradually raised to 120° C. over a period of 14 hours for quenching, to obtain a substantially non-crosslinked water-absorptive soft ocular lens material as a rod having a diameter of about 15 mm. The number average molecular weight of the ocular lens material was about 1,000,000.

The obtained rod-shaped ocular lens material was cut into a plate having a thickness of 1 mm, which was put into a mold corresponding to a shape of a contact lens (thickness: 0.2 mm, diameter: 12 mm), mounted on a compression molding machine and after closing the mold, heated under a pressure of 820 kgf/cm$^2$ at 250° C. over a period of 35 minutes to cure the ocular lens material, whereupon the mold was opened, and the shaped product was taken out, followed by cutting and grinding of the edge, to obtain a water absorptive soft contact lens shaped product in a dry state. Then, the contact lens shaped product obtained by the above compression molding was immersed in a physiological saline solution, which was then put into an autoclave and treated with high temperature high pressure steam of 121° C. for 20 minutes, to obtain a crosslinked water-absorptive soft contact lens.

The obtained contact lens had sufficient softness and flexibility as a soft contact lens.

Further, the size of the obtained contact lens was measured, whereby the size was exactly the same as the desired size with a thickness of 0.2 mm and a diameter of 12 mm, thus indicating that the contact lens was prepared with extremely high precision.

Further, the transparency, water content and size change as physical properties of the contact lens were examined by the following methods. The results are shown in Table 1.

(a) Transparency

The contact lens was visually observed and evaluated in accordance with the following evaluation standards.

Evaluation standards

A: Transparent without any turbidity

B: Slightly turbid

C: Substantially turbid (b) Water content

The water content (wt %) was calculated by the following formula:

$$\text{Water content (wt \%)} = \{(W-W_0)/W\} \times 100$$

where W is the weight (g) of the contact lens upon absorption of water to the equilibrium state, and $W_0$ is the weight (g) of the contact lens in a dried state.

(c) Size change

The contact lens was subjected to boiling treatment over a period of 200 hours, whereupon the size (diameter) was measured, and the size change (%) with respect to the diameter, was calculated by the following formula from the measured value and the size (diameter) before the boiling treatment.

Size change (%)={|D−D₀|/D₀}×100 where D is the size (diameter (mm)) after the boiling treatment, and $D_0$ is the size (diameter (mm)) before the boiling treatment.

EXAMPLE 2

A cell mold was prepared by sandwiching a gasket having a thickness of 1.1 mm by a combination of a sheet and a glass plate having a thickness of 1 mm and a size of 15×15 cm.

The polymerizable components as identified in Table 1 were blended with AIBN in an amount as identified in Table 1, per 100 parts by weight of the polymerizable components, and the mixture was sealed in a cell of the cell mold.

Then, polymerization of the polymerizable components and quenching were carried out in the same manner as in Example 1 to obtain a substantially non-crosslinked water-absorptive soft ocular lens material as a sheet having a thickness of 1 mm. The number average molecular weight of the ocular lens material was about 1,000,000.

From the obtained sheet-shaped ocular lens material, a disk having a diameter of 12 mm was punched out, and this disk was subjected to compression molding in the same manner as in Example 1 to obtain a water-absorptive soft contact lens shaped product in a dry state.

Then, the obtained contact lens shaped product was treated with high temperature high pressure steam in the same manner as in Example 1 to obtain a crosslinked water-absorptive soft contact lens.

The obtained contact lens had sufficient softness and flexibility as a soft contact lens.

Further, the size of the obtained contact lens was measured, whereby it was exactly the same as the desired size with a thickness of 0.2 mm and a diameter of 12 mm, thus indicating that the contact lens was prepared with extremely high precision.

Further, the physical properties of the contact lens were examined in the same manner as in Example 1. The results are shown in Table 1.

EXAMPLE 3

Into a round bottom flask having a capacity of 2 l equipped with a Dimroth condenser, dry tetrahydrofuran was introduced. Then, the polymerizable components as identified in Table 1 were blended with AIBN in an amount as identified in Table 1, per 100 parts by weight of the polymerizable components, and the mixture was introduced into the round bottom flask.

Then, the polymerizable components were polymerized over a period of 1.5 hours at a reflux temperature (about 67° C.) of tetrahydrofuran under reflux of nitrogen gas, to obtain a polymer solution. This polymer solution was dropwise added into hexane, and the obtained polymer was dried to obtain a substantially non-crosslinked water-absorptive soft ocular lens material in a powder form. The number average molecular weight of this ocular lens material was about 70,000.

The obtained powder-form ocular lens material was subjected to compression molding in the same manner as in Example 1, to obtain a water-absorptive soft contact lens shaped product in a dry state.

Then, the obtained contact lens shaped product was treated with high temperature high pressure steam in the same manner as in Example 1, to obtain a crosslinked water-absorptive soft contact lens.

The obtained contact lens had sufficient softness and flexibility as a soft contact lens.

Further, the size of the obtained contact lens was measured, whereby it was exactly the same as the desired size with a thickness of 0.2 mm and a diameter of 12 mm, thus indicating that the contact lens was prepared with extremely high precision.

Further, the physical properties of the contact lens were examined in the same manner as in Example 1. The results are shown in Table 1.

EXAMPLES 4 AND 5

Substantially non-crosslinked water-absorptive soft ocular lens materials were prepared in the same manner as in Example 1 except that in Example 1, the amounts of the polymerizable components and AIBN were changed as shown in Table 1. The number average molecular weights of these ocular lens materials were about 1,000,000, respectively.

Using the obtained ocular lens materials, water-absorptive soft contact lens shaped products in a dry state were obtained in the same manner as in Example 1.

Then, the obtained contact lens shaped products were treated with high temperature high pressure steam in the same manner as in Example 1, to obtain crosslinked water-absorptive soft contact lenses.

The obtained contact lenses had sufficient softness and flexibility as soft contact lenses.

Further, the sizes of the obtained contact lenses were measured, whereby they were exactly the same as the desired sizes with a thickness of 0.2 mm and a diameter of 12 mm, thus indicating that they were prepared with extremely high precision.

Further, the physical properties of these contact lenses were examined in the same manner as in Example 1. The results are shown in Table 1.

In Examples 1 to 5, there were no contact lenses which were damaged by the boiling treatment over 200 hours during the measurements of the size change (c), and there were no changes in their appearance and shapes.

The abbreviations used in Table 1 represent the following compounds.

StSiOM: p-trimethoxysilylstyrene of the formula:

NVP: N-vinylpyrrolidone
MMA: Methyl methacrylate

TABLE 1

| Example No. | Polymerizable components (mol) | | | Amount of AIBN per 100 parts by weight of the polymerizable components (parts by weight) | Physical properties | | |
|---|---|---|---|---|---|---|---|
| | StSiOM | NVP | MMA | | Transparency | Water content (wt %) | Size change (%) |
| 1 | 9 | 62 | 29 | 0.1 | A | 45 | ≦2 |
| 2 | 8 | 53 | 39 | 0.1 | A | 38 | ≦2 |
| 3 | 8 | 44 | 48 | 0.2 | A | 32 | ≦2 |
| 4 | 4.5 | 64.5 | 31 | 0.1 | A | 52 | ≦2 |
| 5 | 10 | 73 | 17 | 0.1 | A | 55 | ≦2 |

From the results shown in Table 1, it is evident that each of the contact lenses obtained in Examples 1 to 5 was excellent in transparency, had good water-absorptivity with a water content of from about 30 to 55 wt % and further was excellent in the dimensional stability and durability with its size change being extremely small at a level of at most 2% even when subjected to severe boiling treatment over a period of 200 hours.

The substantially non-crosslinked water-absorptive soft ocular lens material of the present invention is the one to which a shaping method capable of producing a large quantity of ocular lenses such as contact lenses or intraocular lenses all at once at a low cost, is applicable.

Further, the water-absorptive soft ocular lens of the present invention prepared by crosslinking a water-absorptive soft ocular lens shaped product obtained by shaping the above ocular lens material by the above shaping method, is excellent not only in transparency but also in dimensional stability and durability.

Furthermore, according to the process of the present invention, the water-absorptive soft ocular lens which is excellent not only in transparency but also in dimensional stability and durability, can be produced with high precision in a desired shape at high productivity.

What is claimed is:

1. A process for producing a water-absorptive soft ocular lens which comprises polymerizing polymerizable components consisting essentially of a methoxysilane compound (A) of the formula (I):

$$X-Z-Si(OCH_3)_n(R^1)_{3-n} \quad (I)$$

wherein X is a (meth)acryloyloxy group, a vinyl group, a group of the formula

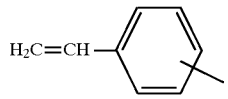

or an allyl group, Z is a direct bond or a $C_{1-3}$ alkylene group, $R^1$ is a $C_{1-6}$ alkyl group, and n is an integer of from 1 to 3, and a hydrophilic monomer (B) which has an unsaturated double bond copolymerizable with the methoxysilane compound (A) and which undergoes no crosslinking reaction, in an amount of at least 45 mol %, to obtain a substantially non-crosslinked water-absorptive soft ocular lens material, shaping the water-absorptive soft ocular lens material into a shape of a desired ocular lens, to obtain a water-absorptive soft ocular lens shaped product, and contacting the water-absorptive soft ocular lens shaped product with water to crosslink the water-absorptive soft ocular lens shaped product.

2. The process for producing a water-absorptive soft ocular lens according to claim 1, wherein the water-absorptive soft ocular lens material is shaped by at least one molding method selected from the group consisting of an injection molding method and a compression molding method.

3. The process for producing a water-absorptive soft ocular lens according to claim 1, wherein the water-absorptive soft ocular lens shaped product is contacted with water by at least one method selected from the group consisting of boiling treatment in water, autoclave treatment, acid treatment, a method of holding in water or a method of holding under high humidity.

4. A water-absorptive soft ocular lens obtained by the process of claim 1.

* * * * *